United States Patent Office 3,287,455
Patented Nov. 22, 1966

3,287,455
METAL PYRIDINE COMPOUNDS
Irving Malkin, University Heights, and Kirman Taylor and Frank W. Hengeveld, Painesville, Ohio, assignors to Diamond Alkali Company, Cleveland, Ohio, a corporation of Delaware
No Drawing. Filed Dec. 3, 1962, Ser. No. 241,555
10 Claims. (Cl. 260—270)

This invention relates to novel compounds containing pyridine and pyridine derivatives and their preparation and use.

The compounds of this invention may be represented by the structure:

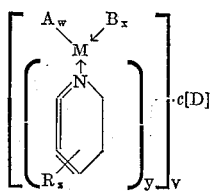

wherein M is a transition metal cation selected from the group consisting of divalent and trivalent cations, A is a monovalent anion selected from the group consisting of $Cl^-$, $CN^-$, $Br^-$, $SCN^-$ and $OH^-$; R is selected from the group consisting of lower alkyl, amino, olefin and carboxyl groups, any free valence bonds being satisfied with hydrogen; B is a ligand selected from the group consisting of negatively charged and neutral uni and bidentate ligands; $v$ is an integer from 1 to 2, inclusive; $x$ is an integer from 0 to 3, inclusive; $y$ is an integer from 1 to 4, inclusive; $z$ is an intgeer from 0 to 1, inclusive; $c$ is an integer from 1 to 2, inclusive; D is a lattice molecule selected from the group consisting of organic solvents and water; $w$ is an integer from 1 to 3, inclusive; in all cases, the sum of $w$ and any valence of $B_x$ is equal to the valence of M.

The term "lower alkyl," as used in the specification and claims herein, is intended to mean an alkyl radical having from 1 to 4 carbon atoms in the chain. "Lattice molecule" means a molecule which is present in stoichiometric proportions and occupies a definite lattice position, but it is not associated directly with any particular anion or cation. The source of such molecules in compounds of this invention, in most cases, is the solvent in which the lattice structure is formed or from water of hydration of starting materials.

The term "ligand," as used in the specification and claims, is intended to mean a group of atoms having one or more pairs of electrons available for the formation of coordinate bonds, as more fully described in the Journal of American Chemical Society, vol. 82, page 5538. A group containing more than one potential coordinating atom is termed a multidentate ligand, the number of potential coordinating atoms being indicated by the terms unidentate, bidentate, etc. According to this meaning, pyridine and its derivatives, as shown in the generic structure above, are also ligands.

Exemplary compounds, falling within the generic concept of this invention are the following:

Trichlorotris(4-vinylpyridine)chromium III

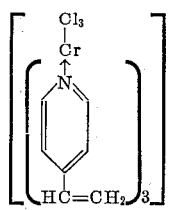

Trichlorotris(4-methylpyridine)chromium III

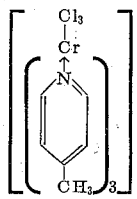

Trichlorotris(2-aminopyridine)chromium III

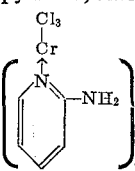

Di-μ-chloro-tetrachlorotetrakis(4-vinylpyridine)diiron III dihydrate

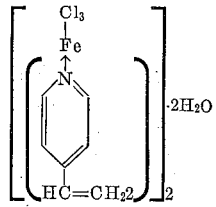

Di-μ-chloro - dihydroxodichlorodiacetonebis(4 - vinylpyridine)diiron III

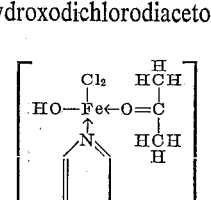

Dichlorobis(4-vinylpyridine)copper II

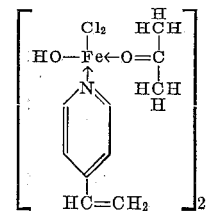

Trichlorotris(4-carboxypyridine)chromium III mono(diethyleneglycol dimethylether)

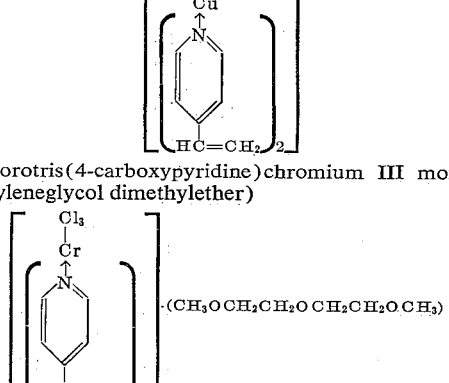

Dichloro(2,4-pentanediono)dipyridine chromium III

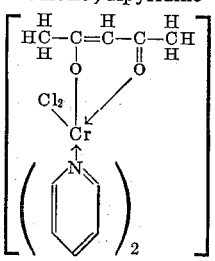

Dichloro(8-quinolinolato)dipyridine chromium III

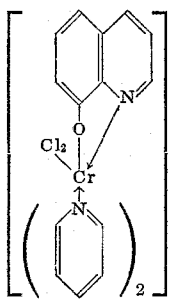

Di-μ-chloro-tetrachlorodiacetonebis(2-vinylpyridine) dichromium III-monoacetone

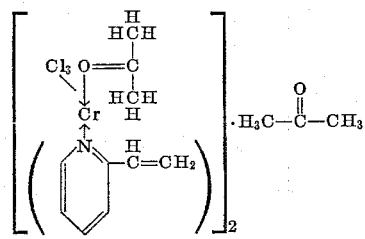

In general, the compounds of this invention, i.e., compounds within the scope of the generic structure above, are prepared in the following steps:

(1) A metal salt, consisting of a transition metal cation and an anion of the type described in the generic structure above, is dissolved in a suitable organic solvent, which conveniently will form a complex with the metal salt, selected from the group consisting of furans, nitriles, alcohols, ethers and ketones. Salts of chromium may require catalytic amounts of a reducing agent and gentle heating to form such complexes. More specifically, the complex of the metal salt with the organic solvent is immediately dissolved in the same solvent as it is formed.

(2) A derivative of pyridine is dissolved in an organic solvent selected from the group, as designated hereinbefore, which may be the same as that used to complex the metal salt.

(3) The metal salt complex is brought together with the pyridine derivative solution slowly and with stirring. The desired compound is apparently formed by preferential displacement of organic solvent molecules in the metal salt complex structure by the pyridine derivatives.

The above procedure may be altered when it is desired to prepare compounds, as described in the generic structure above, wherein a ligand, in addition to pyridine or derivative of pyridine, is desired in the compound. In this instance, the metal salt and ligand are dissolved in separate quantities of pyridine. The ligand-pyridine solution is then added slowly and with heating and stirring to the metal salt-pyridine solution. The desired compound, with the added ligand attached, is precipitated as it is formed.

As the initial step in the practice of this invention, a metal salt complex is prepared by mixing a metal salt with an organic solvent, selected from the group as designated hereinbefore. When using a chromium salt heating the mixture in the presence of a catalystic amount of reducing agent, such as finely divide metallic zinc or chromous chloride, may be needed. The organic solvent and the metal salt are present in the reaction mixture in a ratio of from about 2.2 to about 8 moles of organic solvent to 1 mole of metal salt, while the amount of reducing agent required in the reaction is extremely small, generally about 1 part reducing agent to 500 to 100 parts of anhydrous metal salt being sufficient. Reflux time required to form the metal complex and to dissolve it has been found generally to be from about 1 to about 14 hours.

The pyridine derivative may be prepared for reaction with the metal salt complex by dissolving the compound in an organic solvent. The number of moles of pyridine derivative desired to be coordinated with one mole of the metal salt will determine the amount of such pyridine derivative to be dissolved. Stoichiometric amounts or amounts in excess of stoichiometric may be used. Sufficient organic solvent, selected from the group as designated hereinbefore, is employed which will dissolve the pyridine derivative and is not otherwise critical to the practice of this invention. Preferably, the amount of solvent is limited to that sufficient to form a solution of pyridine derivative, and which is insufficient to prevent precipitation of the desired compound as it is formed in the next step. Pyridine derivatives used in the practice of this invention are soluble in most organic solvents, as designated hereinbefore, requiring no special treatment to effect solution.

The metal salt complex is brought together with the solution of pyridine derivative with agitation, the reaction in some cases proceeding immediately; in other cases, reflux of the solvent is necessary for up to about 20 hours. In some instances, particularly when using vinyl pyridine, the metal salt complex is added slowly. More specifically, slow addition is made so as to minimize the possibility of ligand polymerization.

In the practice of this invention in forming metal salt complexes of pyridine, in which an additional ligand is desired to be incorporated, the metal salt complexes readily with the pyridine, without the aid of a catalyst. In some instances, slight heating may be required. The additional organic ligand to be incorporated into the compound is readily dissolved in pyridine. A molar ratio of approximately 3:1 of pyridine to organic ligand is employed to provide convenient handling and to aid in controlling the subsequent reaction with the metal salt-pyridine complex. The ligand solution is then added to the metal salt complex of pyridine dropwise, over a period of 1 to 2 hours, at reflux temperature. The reaction mixture is then refluxed an additional one-half to 20 hours, during which time the desired compound forms and precipitates out of solution.

In the method of this invention, all the reactants employed are preferably maintained in an anhydrous condition. It has been found that water present in the reactant may inhibit the formation of the desired complex, especially when using salts of chromium III. While the exact mechanism of the interference is unknown, it is believed that the water forms a preferential complex with the metal salt which cannot be displaced by the ligand employed in this invention. Good results can be achieved by drying the metal salt in an oven at 120° C. Pyridine and pyridine derivatives are dried by distillation from KOH. Organic solvents are treated with dehydrating agents such as anhydrous $MgSO_4$, $K_2CO_3$, $CaH_2$, followed by filtration and/or distillation.

The compounds produced by the method of this invention are recovered from the organic solvent as a precipitate in the conventional manner of filtration. Removal of the organic solvent from the system by distillation before filtration is at times advantageous.

The novel compounds produced by the process of this invention are biologically-active, having particular utility as nematocides, bactericides and fungicides.

While it is possible to apply the compounds of the present invention in undiluted form to the plant or soil, it is frequently desirable to apply them in admixture with either solid or liquid inert, pesticidal adjuvants. Thus, they can be applied to the plants or soil for fungicidal purposes, for example, by spraying with aqueous or organic solvent dispersions of the compound. The choice of an appropriate solvent is determined largely by the concentration of active ingredient which it is desired to employ, by required solvent volatility, the solvent cost and nature of the material being treated. Among the many suitable organic solvents which can be employed as carriers for the present materials, there may be mentioned hydrocarbons such as benzene, toluene, xylene, kerosene, diesel oil, fuel oil, petroleum, and naphtha; ketones such as acetone, methyl ethyl ketone and cyclohexanone; chlorinated hydrocarbons, such as carbon tetrachloride, chloroform, trichloroethylene, and perchloroethylene; esters such as ethyl acetate, amyl acetate and butyl acetate; the monoalkyl ethers of ethylene glycol, e.g., the monomethyl ethers; and the monoalkyl ethers of diethylene glycol, e.g., the monoethyl ether; alcohols such as ethanol, isopropanol, and amyl alcohol, etc.

The compounds of this invention can also be applied to plants and other materials along with inert solid herbicidal or pesticidal adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, etc., pumice, tripoli, wood flour, walnut shell flour and lignin.

It is frequently desirable to incorporate a surface active agent in the fungicidal and pesticidal compositions of this invention. Such surface active agents are advantageously employed in both the solid and liquid compositions. The surface active agent can be anionic, cationic, or nonionic in character.

Typical classes of surface active agents include alkyl sulfonates; alkylaryl sulfonates; alkyl sulfates; alkylamide sulfonates; alkylaryl polyether alcohols; fatty acid esters of polyhydric alcohols; ethylene oxide addition products of such esters; addition products of long-chain mercaptans and ethylene oxide; sodium alkyl benzene sulfonates having 14 to 18 carbon atoms; alkylphenolethylene oxides, e.g., p-isooctylphenol condensed with 10 ethylene oxide units; soaps, e.g., sodium stearate and sodium oleate; and certain quaternary ammonium salts.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust, containing active ingredients, usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 percent to 50 percent of the total by weight. However, concentrations outside this range are operative and compositions containing from 1 percent to 99 percent of active ingredient by weight are contemplated, the remainder being carrier and/or any other additive or adjuvant material which may be desired. It is often advantageous to add small percentages of surface active agents, e.g., 0.5 percent to 1 percent of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, a 0.5 percent to 1 percent of a surface active agent by weight is included in the liquid composition.

For adjuvant purposes, any desired quantity of surface active agent may be employed, such as up to 250 percent of the active ingredient by weight. If the surface active agent is used only to impart wetting qualities, for example, to the spray solution, as little as 0.05 percent by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30 percent by weight of the total and may be 10 percent, or even as low as 0.01 percent.

The novel compounds of the present invention can be employed in compositions containing other pesticides, more especially fungicides, insecticides, herbicides, nematocides, and bactericides, e.g., captan, phenothiazine, pyrethrum, rotenone, chlordane, DDT, dimethyl tetrachloroterephthalate, dibromochloropropane, dichlorophene, etc.

In order that those skilled in the art may better understand the present invention and the preferred methods by which it may be practiced, the following specific examples are offered.

EXAMPLE 1

*Preparation of trichlorotris(4-vinylpyridine)chromium III*

Anhydrous chromic chloride, 0.21 mole, is dissolved in 250 ml. of anhydrous freshly-distilled acetone, in the presence of 0.15 g. of zinc metal dust. The reaction mixture is agitated and cautiously heated until the solution process has been initiated, at which time the reaction mixture is heated to reflux temperature for about one-half hour. To 450 ml. of anhydrous freshly-distilled acetone, under a dry nitrogen gas blanket, is added 0.68 mole of 4-vinyl-pyridine, 7.9% excess over the stoichiometric amount required for 3 moles of 4-vinylpyridine per mole of chromic chloride. To inhibit polymerization of the 4-vinylpyridine, 0.35 g. of hydroquinone is added to the acetone solution. The acetone solution of the chromic chloride complex is added, dropwise, at a rapid rate to the stirred solution of 4-vinylpyridine at room temperature over a period of one-half hour. A bright green precipitate is formed. Excess solvent is removed from the system by warming and applying a vacuum to the reaction vessel. The crude product is filtered and washed several times with anhydrous ethyl ether giving 104 g. of crude product, and purified by recrystallization from ethylene dichloride. The purified product is identified as trichlorotris(4-vinylpyridine)chromium III by the following elemental analysis:

| Element | Calculated percent by weight | Actual percent by weight |
| --- | --- | --- |
| Carbon | 53.3 | 52.6 |
| Nitrogen | 8.88 | 9.5 |
| Chromium | 11.0 | 10.94 |

EXAMPLE 2

*Prepartion of trichlorotris(4-methylpyridine) chromium III*

A solution of chromic chloride in acetone is prepared by the method of Example 1, by dissolving 0.032 mole of chromic chloride in 200 ml. of anhydrous acetone. To 100 ml. of anhydrous acetone is added 0.12 mole of 4-methylpyridine, 25 percent in excess of the stoichiometric amount required for three moles of 4-methylpyridine per mole of chromic chloride. The chromic chloride solution is added, dropwise, to the stirred solution of 4-methylpyridine. A reaction takes place immediately, forming a bright green solution. A precipitate forms when essentially all of the chromic chloride solution has been added. Acetone is distilled from the system and the resulting slurry is filtered, washed with anhydrous ethyl ether and purified by recrystallization from ethylene dichloride. A crystalline product is obtained, which is identified as trichlorotris(4-methylpyridine) chromium III by the following elemental analysis:

| Element | Calculated percent by weight | Actual percent by weight |
| --- | --- | --- |
| Chromium | 11.9 | 11.3 |
| Chlorine | 24.3 | 25.2 |

EXAMPLE 3

*Preparation of trichlorotris(2-aminopyridine) chromium III*

A solution of chromic chloride in acetone is prepared according to the method of Example 1, by dissolving 0.11 mole of chromic chloride in 300 ml. of anhydrous acetone. To 200 ml. of anhydrous acetone is added 0.34 mole of 2-aminopyridine, which dissolves in the acetone. The acetone solution of 2-aminopyridine is added, dropwise, to the chromic chloride solution with stirring. A viscous green liquid separates from the bulk of the reaction mixture. After 200 ml. of diethylene glycol dimethyl ether is added to the reaction mixture the acetone is removed by fractional distillation. After cooling and decanting, the excess diethylene glycol dimethyl ether is removed by evaporation in a dry box, leaving a dark green amorphous solid product. The product is identified as trichlorotris(2-aminopyridine)chromium III by the following elemental analysis:

| Element | Calculated percent by weight | Actual percent by weight |
| --- | --- | --- |
| Chromium | 11.8 | 11.0 |
| Chlorine | 24.1 | 22.9 |

EXAMPLE 4

*Preparation of trichlorotris(4-carboxypyridine)chromium III mono(diethyleneglycol dimethylether)*

A chromic chloride solution in acetone is prepared according to the method of Example 1, by adding 0.095 mole of anhydrous chromic chloride to 300 ml. of anhydrous acetone. A suspension of 4-carboxypyridine in diethyleneglycol dimethyl ether is prepared by adding 0.28 mole of 4-carboxypyridine to 200 ml. of anhydrous diethyleneglycol dimethyl ether. The chromic chloride solution is then added to the vigorously stirred 4-carboxypyridine suspension. The reaction mixture is heated to reflux temperature for about 20 hours, after which the excess acetone is fractionally distilled out of the reaction mixture. A green crystalline precipitate is recovered by filtration, washed with anhydrous ether and excess solvent is removed by warming under reduced pressure. The product is identified as trichlorotris(4-carboxypyridine)chromium III mono(diethyleneglycol dimethylether) by the following elemental analysis:

| Element | Calculated percent by weight | Actual percent by weight |
| --- | --- | --- |
| Chromium | 7.87 | 7.87 |
| Chlorine | 16.1 | 17.0 |

EXAMPLE 5

*Preparation of dichloro(2,4-pentanediono)dipyridine chromium III*

A solution of chromic chloride in pyridine is prepared by adding 0.2 mole of chromic chloride to 1 liter of pyridine. An exothermic reaction occurs as the chromic chloride dissolves, forming a pyridine complex. An additional 473 ml. of pyridine is added to the solution, followed by 30 minutes of reflux to completely dissolve the chromic chloride. Acetyl acetonate is dissolved in pyridine by adding 0.2 mole of redistilled acetyl acetonate to 90 ml. of pyridine. The pyridine solution of acetyl acetonate is added, dropwise, over a period of two hours at reflux temperature, with rapid stirring, to the chromic chloride solution. As the last few drops of acetyl acetonate is added, a green crystalline product is formed. The reaction mixture is refluxed for an additional 30 minutes and allowed to cool. A solid product is recovered, 35.7 g., which is identified as dichloro(2,4-pentanediono)dipyridine chromium III by the following elemental analysis:

| Element | Calculated percent by weight | Actual percent by weight |
| --- | --- | --- |
| Carbon | 47.4 | 47.3 |
| Hydrogen | 4.5 | 4.5 |
| Chromium | 13.7 | 13.4 |
| Chlorine | 18.7 | 18.3 |
| Nitrogen | 7.4 | 7.3 |

EXAMPLE 6

*Preparation of dichloro(8-quinolinolato)dipyridine chromium III*

A solution of chromic chloride in pyridine is prepared by adding 0.5 moles of chromic chloride to 1,946 ml. of pyridine. The mixture is warmed slightly, after which a rapid reaction occurs. Upon cooling, a mass of green crystalline solid is recovered by filtration. The crystals, trichlorotrispyridine chromium III, are washed with 3 portions of anhydrous ether and dried for 1 hour at 100° C. under a slight vacuum. The crystals are redissolved in pyridine by first grinding 0.1 mole of trichlorotrispyridine chromium III in a mortar, then added to 500 ml. of pyridine with stirring. The mixture is refluxed for 10 minutes. A solution of 8-hydroxyquinoline in pyridine is prepared by adding 0.1 mole of 8-hydroxyquinoline to 75 ml. of pyridine. The solution of 8-hydroxyquinoline is added, dropwise, to the pyridine solution of trichlorotris(pyridine)chromium III at reflux temperature with stirring, over a period of 1½ hours. The reaction mixture is refluxed 17 hours and allowed to cool and stand for 24 hours. The crystalline product recovered from the reaction mixture is washed twice with pyridine, five times with distilled water, and three times with ether. The crystals are air-dried for several hours, transferred to a vacuum oven and dried at 100° C. under full vacuum for 6 hours. The dried product gives 37 g. (87% yield) of a compound which is identified as dichloro(8-quinolinolato) dipyridine chromium III by the following elemental analysis:

| Element | Calculated percent by weight | Actual percent by weight |
| --- | --- | --- |
| Carbon | 53.6 | 53.6 |
| Hydrogen | 3.8 | 3.4 |
| Chromium | 12.2 | 12.2 |
| Chlorine | 16.7 | 16.8 |

EXAMPLE 7

*Preparation of di-μ-chloro-tetrachlorotetrakis-(4-vinylpyridine)diiron III-dihydrate*

To a 500-ml., three-necked, round-bottom flask, equipped with a reflux condenser, drying tube, and stirrer, is added 23.3 g. of ferric chloride. The ferric chloride is dissolved in acetone by adding, dropwise, 200 ml. filtered acetone. An exothermic reaction occurs which brings the reaction mixture to reflux temperature. After cooling, 44.4 moles of 4-vinylpyridine in 150 ml. of filtered acetone is added by means of a dropping funnel. Vigorous stirring is necessary, especially after approximately one-third of the 4-vinylpyridine solution is added, as the reaction mixture thickens with a precipitate. After addition of the 4-vinylpyridine solution is completed, the reaction mixture is heated to reflux temperature for a period of about 20 hours. Upon cooling, a red-brown solid separates from the reaction mixture. The solid product is recovered by filtration, washed twice with anhydrous ether, and dried at room temperature. A yield of 49.1 g. of product (71.4%) is recovered and identified as di-$\mu$-chlorotetrachlorotetrakis(4-vinylpyridine)diiron III-dihydrate by the following elemental analysis:

| Element | Calculated percent by weight | Actual percent by weight |
|---|---|---|
| Nitrogen | 6.8 | 6.7 |
| Iron | 13.6 | 13.5 |
| Chlorine | 26.0 | 26.5 |

EXAMPLE 8

*Preparation of di-$\mu$-chloro-dihydroxodichlorodiacetonebis(4-vinylpyridine)diiron III*

A solution of ferric chloride in acetone is prepared by adding 20.9 g. of ferric chloride to 300 ml. of filtered acetone. An exothermic reaction occurs as the ferric chloride dissolves. A solution of 4-vinylpyridine in acetone is prepared by adding 33.3 g. of 4-vinylpyridine to 300 ml. of filtered acetone. The ferric chloride solution is transferred to a dropping funnel and added, dropwise, to the 4-vinylpyridine acetone solution with vigorous stirring. The reaction mixture is stirred and refluxed for one hour after the addition of the ferric chloride solution, at which time a solid granular product precipitates. The reaction mixture is cooled, filtered and the solid product washed twice with anhydrous ether. Thirty grams of the reaction product is recovered and is identified as di-$\mu$-chloro-dihydroxodichloro-diacetonebis(4-vinylpyridine)diiron III by the following elemental analysis:

| Element | Calculated percent by weight | Actual percent by weight |
|---|---|---|
| Nitrogen | 4.56 | 5.1 |
| Chlorine | 23.1 | 23.6 |
| Iron | 18.2 | 17.9 |

EXAMPLE 9

*Preparation of dichlorobis(4-vinylpyridine)copper II*

A solution of cupric chloride in ethanol is prepared by dissolving 0.16 mole of cupric chloride in 200 ml. of absolute ethanol. A solution of 4-vinylpyridine in ethanol is prepared by dissolving 0.32 mole of 4-vinylpyridine in 100 ml. of absolute ethanol. A small amount of 2,4-dinitrochlorobenzene is added to each solution as a polymerization inhibitor. The 4-vinylpyridine solution is added, dropwise, with stirring at room temperature to the cupric chloride solution. A precipitate forms immediately and an additional 350 ml. of absolute ethanol is required to render the reaction mixture fluid. The reaction mixture is refluxed for 2 hours at 78° C. after the addition of the 4-vinylpyridine solution. A solid reaction product is separated by filtration and washed three times with anhydrous ethanol. Excess ethanol is removed by vacuum at room temperature. The crystalline product is ground and placed in a dessicator and dried under vacuum at 54° C. A yield of 20.3 g. (36.8%) of a pale blue powder is recovered, which is identified as dichlorobis(4-vinylpyridine) copper II by the following elemental analysis:

| Element | Calculated percent by weight | Actual percent by weight |
|---|---|---|
| Copper | 18.4 | 18.0 |
| Chlorine | 20.6 | 20.4 |

EXAMPLE 10

*Preparation of di-$\mu$-chloro-tetrachlorodiacetonebis(2-vinylpyridine)dichromium III-monoacetone*

A solution of chromic chloride in acetone is prepared according to the method of Example 1, by dissolving 0.09 mole of anhydrous chromic chloride in 300 ml. of anhydrous acetone. The chromic chloride solution is filtered and placed in a flask, equipped with a reflux condenser and a mechanical stirrer. To the flask is added 33 ml. of freshly-distilled 2-vinylpyridine, dropwise, with vigorous stirring. A solid precipitate separates from the acetone. The supernatant acetone is poured off and the solid remaining washed with acetone. The hydroscopic violet-colored solid is identified as di-$\mu$-chloro-tetrachlorodiacetonebis(2-vinylpyridine)dichromium III-monoacetone by the following elemental analysis:

| Element | Calculated percent by weight | Actual percent by weight |
|---|---|---|
| Nitrogen | 3.9 | 3.9 |
| Chromium | 14.8 | 14.7 |
| Chlorine | 30.3 | 29.9 |

EXAMPLE 11

This test is an evaluation of the effectiveness of the compounds of this invention against root-knot nematodes (Meloidogyne sp.).

Composted greenhouse soil diluted by one-third with clean, washed sand is placed in half-gallon glaze crocks and infested with 3 to 5 g. of knotted or galled tomato roots. Treatment is accomplished by mixing the test chemical intimately with the soil if a solid, or by drenching, if a liquid, paste, or of gummy consistency. The drench formulation contains 4% acetone, 0.01% Triton X-155, 0.384% test chemical in a total volume of 100 ml. of water, all of which is drenched on the test crock. Concentration of this formulation is 256 pounds per acre, based on the surface area of the half-gallon test container. The soil surface area equals 21.7 square inches; therefore, 256 pounds per acre equals 384 mg. of chemical. Lower concentrations are prepared by employing less of the test chemical in the formulation. The mixing of the solid test chemicals is accomplished by placing the infested soil and the chemical in a 20-pound paper bag and mixing thoroughly. The soil is then replaced in the crock to which is added 100 ml. of water. In the case of the drench treatment, the chemicals are mixed after 2 or 3 days as described above via the paper bag method. After treatment, all crocks are stored at 20° C., being covered with plastic to maintain moisture.

Seven days after treatment, three seedling (var. Bonny Best) tomatoes are transplated into each crock. After three weeks in the greenhouse, the plants are removed from the soil carefully and the roots inspected for nematode galls. Phytotoxicity results are also reported (0=no effect to 11=plant dead). Each of the three plant root systems is rated separately and the average is multiplied by 10 and subtracted from 100 to give percent nematode control. Results of the test are as follows:

| Compound | Phytotoxicity Rating | Concentration lbs./acre | Percent Control Rootknot Nematodes |
|---|---|---|---|
| Trichloro-tris (4-vinylpyridine) chromium III | 0 | 16 | 100 |
|  | 0 | 8 | 50 |

EXAMPLE 12

Pinto bean plants, at a growth stage when the trifoliate leaves are just beginning to emerge from the axil of the seed leaves, are used as the test species. These plants are grown in 4-inch pots and thinned to three plants per pot. Usually the plants are about 10 to 14 days old from time of planting. There are, therefore, six primary seed leaves per pot for each test unit. In the test, and appropriate amount of the test formulation is drenched on each pot. This test formulation contains 0.4 g. of test compound, 8 ml. acetone, 4 ml. stock emulsifier solution (0.5% Triton X–155 in water by volume) and 187.6 ml. distilled water. The concentration of toxicant in this formulation is 2000 parts per million. A dosage of 56 ml. of the test formulation is equivalent to 112 mg. of chemical or 128 pounds per acre. Lower concentrations of toxicant are obtained by diluting the formulation with distilled water. About two or three hours after treatment, the plants are exposed to a spore suspension of bean rust from a culture maintained in the greenhouse. It is not necessary to apply the spores to the plants, but spores are carried by air currents from the culture to the treated plants giving heavy uniform infection on the controls at the end of the holding period. After exposure, the plants are immediately placed in a moist chamber in a saturated atmosphere at 60° F., for 24 hours after which they are removed to the greenhouse. The rust spore suspension is prepared with one part of rust spores, 16 parts of talc and 26,000 parts of water. Counts are made about 10 days after spore exposure and the mean number of rust pustules per leaf is determined. These counts are calculated against the check counts to arrive at the percentage disease control. Using this procedure, the following results are obtained.

| Compound | Dosage lbs./acre | Percent Disease Control |
|---|---|---|
| Trichlorotris (4-vinylpyridine) chromium III | 128 | 83 |

EXAMPLE 13

Test formulations are examined for ability to inhibit the growth of four bacterial species *Erwinia amylovora* (*E.a.*), *Xanthomonas phaseoli* (*X.p.*), *Micrococcus pyrogenes* var. *aureus* (*M.a.*), and *Escherechia coli* (*E.c.*) at various concentrations. The basic test fomulation contains 0.1 g. of the test chemical, 4 ml. acetone, 2 ml. stock emulsifier solution (0.5% Triton X–155 in water by volume) and 74 ml. distilled water, the concentration of toxicant in this formulation being 1250 parts per million. Lower concentrations of toxicant are obtained by diluting the basic formulation with distilled water. All of the bacterial species are cultured on nutrient agar slants except *X. phaseoli* which is grown on potato dextrose agar.

The cultures used for testing are subcultured for two sequential 24-hour periods to insure uniform test populations. Bacterial suspensions are made from the second sub-culture in the culture tube by addition of distilled water and gentle agitation, after which they are filtered through double layers of cheesecloth and adjusted to standard concentrations by turbidimetric measurement. Each of four test tubes arranged in a rack receive one ml. of the 1250 p.p.m. test formulation. After the test formulations have been measured into a test tube, 3½ ml. of distilled water and one-half ml. of bacterial suspension for each respective test organism is added to each test tube. The medication tubes are then set aside at room temperature for four hours. After this exposure period, transfers are made by means of a standard 4 mm. platinum loop to 7 ml. of sterile broth. The broth tubes are then incubated for 48 hours at 29° to 31° C., at which time bacterial growth is determined by turbindimetric measurement. A reading is recorded for each test tube after shaking. Three replicates of each organism serve as controls. Comparative growth calculations are made on the percent of the mean check reading. This value, subtracted from 100, gives percent control as compared to checks. Using this procedure, the following results are obtained:

| Compound | Concentration (p.p.m.) | Percent Control | | | |
|---|---|---|---|---|---|
| | | E. Amylovora | X. Phaseoli | M. Aureus | E. Coli |
| Trichlorotris (4-methylpyridine)chromium III | 16 | 60 | 0 | 100 | 70 |
| Trichlorotris (2-aminopyridine)chromium III | 250 | 53 | 0 | 67 | 58 |
| Trichlorotris (4-carboxypyridine)chromium III mono(diethylene-glycol dimethylether) | 250 | 53 | 60 | 58 | 25 |
| Dichloro (8-quinolinolato)dipyridine chromium III | 250 | 0 | 0 | 16 | 21 |
| Trichlorotris (4-vinylpyridine) chromium III | 16 | 75 | 48 | 23 | 40 |
| Trichlorotrispyridine chromium III | 250 | 100 | 78 | 88 | 87 |

EXAMPLE 14

This test measures the systematic fungicidal action of compounds of this invention against the powdery mildew. Tender green bean plants, about four to six inches tall, four per 3½-inch clay pot are treated. In this test a formuation containing 0.4 g. of test compound, 8 ml. acetone, 4 ml. stock emulsifier solution (0.5% Triton X–155 in water by volume) and 187.6 ml. distilled water is poured on the soil surface. The concentration of toxicant in this formulation is 2000 parts per million. A dosage of 41.6 ml. of the formulation is equivalent to a concentration of active chemical of 83.2 mg. per pot or 128 pounds per acre. Lower concentrations of toxicant are obtained by diluting the formulation with distilled water.

Plants are treated and then exposed to mildew spores from a culture maintained in the greenhouse. It is not necessary to apply the spores to the plants, but spores are carried by air currents from the culture to the treated plants giving a heavy uniform infection on the controls at the end of the holding period. Results are recorded after two weeks by estimating disease control based on check plants. Using this procedure, the following results are obtained:

| Compound | Dosage lbs./acre | Percent Disease Control |
|---|---|---|
| Trichlorotris (2-aminopyridine) chromium III | 128 | 99 |
| | 100 | 50 |
| | 64 | 20 |

EXAMPLE 15

The tomato foliage disease test measures the ability of the test compound to protect tomato foliage against infection by the early blight fungus *Alternaria solani* (Ell. and Mart.) Jones and Grout and the late fungus *Phytophthora infestans* (Mont.) deBarry. The method used is a modification of that described by McCallan and Wellman and employs tomato plants (var. Bonny Best) 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing 0.2 g. of test compound, 8 ml. acetone, 4 ml. stock emulsifier solution (0.5 Triton X–155 in water by volume) and 187.6 ml. distilled water is applied at dosages equivalent to 2000 and 400 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation without toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight, to permit spore germination and infection before removal to the greenhouse. After two days from the start of the test for early blight and three days for late blight, lesion counts are made on the three uppermost fully expanded leaves. The data are converted to percentage disease control based on the number of lesions obtained on the control plants. Dosages and percent disease control are given in the following table:

| Compound | Dosage (p.p.m.) | Percent Disease Control | Type Fungus |
|---|---|---|---|
| Trichlorotris (4-carboxypyridine) chromium III mono(diethyleneglycol dimethylether) | 2,000<br>400<br>2,000 | 90<br>57<br>70 | E. blight.<br>Do.<br>L. blight. |

It is to be understood that although the invention has been described with specific reference to particular embodiments thereof, it is not to be so limited, since changes and alterations therein may be made which are within the full intended scope of this invention as defined by the appended claims.

What is claimed is:
1. Trichlorotris(4-vinylpyridine)chromium III.
2. Trichlorotris(4-methylpyridine)chromium III.
3. Trichlorotris(2-aminopyridine)chromium III.
4. Trichlorotris(4-carboxypyridine)chromium III mono(diethyleneglycol dimethylether).
5. Dichloro(2,4-pentanediono)dipyridine chromium III.
6. Dichloro(8-quinolinolato)dipyridine chromium III.
7. Di - $\mu$ - chloro-tetrachlorotetrakis(4-vinylpyridine) diiron III dihydrate.
8. Di - $\mu$ - chloro - dihydroxodichlorodiacetonebis(4 - vinylpyridine)diiron III.
9. Dichlorobis(4-vinylpyridine)copper II.
10. Di - $\mu$ - chloro-tetrachlorodiacetonebis(2-vinylpyridine)dichromium III-monoacetone.

References Cited by the Examiner
UNITED STATES PATENTS

| | | | |
|---|---|---|---|
| 2,054,490 | 9/1936 | Stusser | 260—270 |
| 2,827,462 | 3/1958 | Dorsey et al. | 260—270 |
| 2,827,463 | 3/1958 | Schaeffer | 260—270 |
| 2,853,416 | 9/1958 | Kellog | 167—33 |
| 2,876,226 | 3/1959 | Schaeffer | 260—270 |
| 2,876,227 | 3/1959 | Schaeffer | 260—270 |
| 2,903,456 | 9/1959 | Schaeffer | 260—270 |
| 2,958,624 | 11/1960 | Bimber | 167—33 |

OTHER REFERENCES

Grant, "Hackh's Chemical Dictionary," Bakiston, 1944, p. 863–4.

ALEX MAZEL, *Primary Examiner.*

JOHN D. RANDOLPH, HENRY R. JILES, *Examiners.*

D. M. KERR, D. G. DAUS, *Assistant Examiners.*

UNITED STATES PATENT OFFICE
CERTIFICATE OF CORRECTION

Patent No. 3,287,455            November 22, 1966

Irving Malkin et al.

It is hereby certified that error appears in the above numbered patent requiring correction and that the said Letters Patent should read as corrected below.

Column 1, line 34, for "intgeer" read -- integer --; column 3, line 64, for "catalystic" read -- catalytic --; line 65, for "divide" read -- divided --; line 70, for "reguired" read -- required --; line 72, for "100" read -- 1000 --; column 4, line 20, after "pyridine" insert -- or pyridine --; column 8, line 4, for "draps" read -- drops --; line 6, for "refiuxed" read -- refluxed -- column 10, line 54, for "transplated" read -- transplanted --; column 12, line 36, for "systematic" read -- systemic --; line 41, for "formuation" read -- formulation --; column 13, line 9, for "0.5" read -- 0.5% --.

Signed and sealed this 12th day of September 1967.

(SEAL)
Attest:

ERNEST W. SWIDER            EDWARD J. BRENNER
Attesting Officer            Commissioner of Patents